United States Patent Office 2,927,941
Patented Mar. 8, 1960

2,927,941

METHOD FOR THE PREPARATION OF FLUOROCARBON ACIDS

John MacMillan Bruce, Jr., Wilmington, Del., assignor to E. I. du Pont de Nemours and Company, Wilmington, Del., a corporation of Delaware No Drawing. Application January 10, 1958
Serial No. 708,073

7 Claims. (Cl. 260—537)

The present invention relates to the preparation of fluorocarbon acids and derivatives thereof, and more particularly to the preparation of fluorocarbon acids and derivatives thereof by the oxidation of completely fluorinated olefins.

Fluorocarbon acids, which are organic acids in which the carbon skeleton except for the carboxyl group is substituted with fluorine atoms have heretofore been prepared primarily by the electrolysis of hydrocarbon acids in the presence of hydrogen fluoride. This method is expensive, difficult to carry out on a large scale and time consuming.

It is an object of the present invention to prepare fluorocarbon acids and their derivatives by a method which is economic and which lends itself to operation on a large scale.

This and other objects of the invention are accomplished by heating a mixture of oxygen and a fluoroolefin having the formula

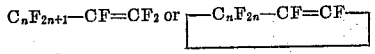

wherein $n$ is an integer of at least one containing, preferably, a molar excess of oxygen to a temperature within the range of 100 to 300° C., recovering a fluorocarbon acid fluoride having the formula $$C_nF_{2n+1}-COF \text{ or } C_nF_{2n}-(COF)_2$$

and, if desirable, converting the said highly reactive acid fluoride to the acid and to acid derivatives by known methods.

The process of the present invention is carried out in a closed vessel in the absence of a catalyst. Gaseous oxygen, either pure or in combination with other inert gases, e.g., air, may be employed. The molar ratio of oxygen to the perfluoroolefin should be, preferably, greater than one, particularly when the reaction is carried out in a batch system. In a continuous system including a recycle stream of the unconverted olefin, the ratio of oxygen to the fluorine can be varied over a wider range to obtain optimum conversion and yields of the acid or acid derivative. In general, the ratio is maintained between two and ten, although higher ratios may be employed. It is generally desirable to carry out the reaction in the presence of an inert solvent. Such solvents facilitate the reaction where the perfluoroolefin is either gaseous or solid at reaction conditions. The oxidation may, however, be performed in the absence of a solvent, particularly where the perfluoroolefin employed is liquid at the reaction conditions. Solvents which are suitable in the process of the present invention are perfluorinated hydrocarbons such as perfluoropentane, perfluorocyclohexane, perfluorodimethylcyclobutane, perfluorooctane, etc.

The perfluoroolefins employed to prepare the fluorocarbon acids according to the present invention are terminally unsaturated perfluoroalkenes having at least three carbon atoms and perfluorocycloalkenes. Suitable perfluoroolefins include perfluoropropylene, perfluorobutene-1, perfluoroheptene-1, perfluorodecene-1, perfluorododecene-1, perfluorooctadecene-1, perfluorocyclobutene, perfluorocyclohexene and perfluoroalkyl-substituted perfluorocyclobutenes and -cyclohexenes. The oxidation of the terminally unsaturated perfluoroalkenes give rise to monocarboxylic acid fluorides having one carbon atom less than the olefin and the oxidation of the cyclic olefins gives rise to dicarboxylic acid fluorides having the same number of carbon atoms as the starting material. The perfluorinated olefins employed in the present invention may be prepared by the pyrolysis of tetrafluoroethylene, by the pyrolysis of polytetrafluoroethylene, and by other methods known in the art.

The acid fluorides obtained by the oxidation of the perfluoroolefins are readily hydrolyzed to the corresponding acids by contact with water. The acids may then be reacted further to form salts, esters and amides, and other acid derivatives according to known procedures. It is furthermore possible to directly form some of the fluorocarbon acid derivatives by reaction with the acid fluoride such as the formation of the amide by the reaction of the acid fluoride with ammonia. The acid fluoride being highly reactive is readily converted into other fluorocarbon acid derivatives.

The process of the present invention is further illustrated by the following examples:

*Example I*

Into a 330 ml. stainless steel autoclave was charged 75 ml. of perfluorodimethyl-cyclohexane and 10 g. of hexafluoropropylene. The reaction vessel was pressured to 280 p.s.i. with air, heated to 200° C. and agitated at that temperature for two hours. The reaction vessel was then cooled and the off-gases containing the perfluoroacetyl fluoride were passed through 100 cc. of water. The resulting aqueous solution was neutralized with calcium hydroxide until a pH of 6.6 was obtained. The precipitated calcium fluoride was removed by filtration, and the filtrate was taken to dryness under vacuum at 70° C. The resulting solid which was filtered and dried, weighed 2.5 g. X-ray and infrared analysis showed the product to be calcium perfluoroacetate, from which the perfluoroacetic acid could be obtained by treating with a slightly acidic medium.

*Example II*

Into a 330 ml. stainless steel autoclave was charged 50 ml. of perfluorodimethylcyclohexane and 15.0 g. of perfluorocyclobutene. The reaction vessel was pressured to 300 p.s.i. with air, heated to 300° C. and agitated for three hours at that temperature. The vessel was cooled, the reaction mixture discharged and washed with water. A one-third portion of the wash-water was evaporated and a white solid weighing 1 g. was obtained which was identified by infrared analysis as perfluorosuccinic acid. The remaining two-thirds portion was sparged with ammonia and evaporated; 2 g. of perfluorosuccinamide melting at 258° C. was isolated.

*Example III*

Into a 330 ml. stainless steel autoclave was charged 50 ml. of perfluorodimethylcyclohexane and 16.9 g. of perfluoroheptene-1. The reactor was pressured to 225 p.s.i. with air heated to 200° C. and agitated at that temperature for a period of two hours. The resulting liquid reaction products were distilled and 2.5 ml. of a fluorocarbon acid fluoride boiling at 64° C. was obtained. To 0.5 ml. of the acid fluoride was added 10 ml. of the solvent and ammonia was passed through the solution. On evaporation of the solvent, perfluorohexanamide having a melting point of 115–117° C. was obtained.

The acid and acid derivatives prepared by the present invention are useful chemical intermediates and also have utility as dispersing agents.

I claim:

1. A process for the preparation of fluorocarbon acid fluorides which comprises heating a perfluoroolefin having formulas of the class consisting of $$C_nF_{2n+1}-CF=CF_2 \text{ and } \overline{-C_nF_{2n}-CF=CF-}$$

wherein $n$ is an integer of at least one with oxygen to a temperature of 100° to 300° C. and recovering an acid fluoride having formulas of the class consisting of $$C_nF_{2n+1}COF \text{ and } C_nF_{2n}(CO)F_2$$

2. The process of claim 1 wherein the perfluoroolefin-oxygen mixture is heated in the presence of a perfluorinated hydrocarbon solvent.

3. A process for the preparation of a fluorocarbon acid which comprises heating a perfluoroolefin having the formula $$C_nF_{2n+1}-CF=CF_2$$

wherein $n$ is an integer of at least one with a molar excess of oxygen to a temperature of 100 to 300° C., hydrolyzing the resulting reaction mixture and recovering an acid having the formula $$C_nF_{2n+1}-COOH$$

where $n$ is an integer of at least one.

4. The process in claim 3 wherein the perfluoroolefin is perfluoropropylene.

5. The process in claim 3 wherein the perfluoroolefin is perfluoroheptene-1.

6. The process for the preparation of a fluorocarbon diacid which comprises heating a perfluoroolefin having the general formula $$\overline{-C_nF_{2n}-CF=CF-}$$

where $n$ is an integer of at least two with a molar excess of oxygen to a temperature of 100 to 300° C., hydrolyzing the resulting reaction mixture and recovering a dicarboxylic acid having the formula $$C_nF_{2n}-(COOH)_2$$

where $n$ is an integer of at least two.

7. The process as set forth in claim 6 wherein the perfluoroolefin is perfluorocyclobutene.

References Cited in the file of this patent

UNITED STATES PATENTS

| | | |
|---|---|---|
| 2,438,485 | Henne | Mar. 23, 1948 |
| 2,453,146 | McBee et al. | Nov. 9, 1948 |
| 2,549,892 | Chaney | Apr. 24, 1951 |
| 2,676,983 | Hurka | Apr. 27, 1954 |
| 2,806,865 | Barnhart et al. | Sept. 17, 1957 |
| 2,819,320 | Drysdale | Jan. 7, 1958 |

UNITED STATES PATENT OFFICE

CERTIFICATE OF CORRECTION

Patent No. 2,927,941 March 8, 1960

John MacMillan Bruce, Jr.

It is hereby certified that error appears in the printed specification of the above numbered patent requiring correction and that the said Letters Patent should read as corrected below.

Column 3, line 14, after "and" the formula should appear as shown below instead of as in the patent:

$$C_nF_{2n}(COF)_2$$

Signed and sealed this 23rd day of August 1960.

(SEAL)
Attest:

KARL H. AXLINE
Attesting Officer

ROBERT C. WATSON
Commissioner of Patents